(12) United States Patent
Hadjioannou et al.

(10) Patent No.: US 10,234,572 B2
(45) Date of Patent: Mar. 19, 2019

(54) MULTIPLE SPATIAL RESOLUTION SCINTILLATION DETECTORS

(71) Applicant: The Regents of the University of California, Oakland, CA (US)

(72) Inventors: Arion-Xenofon Hadjioannou, Los Angeles, CA (US); Zheng Gu, Los Angeles, CA (US); David Prout, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 18 days.

(21) Appl. No.: 15/328,583

(22) PCT Filed: Jul. 27, 2015

(86) PCT No.: PCT/US2015/042321
§ 371 (c)(1),
(2) Date: Jan. 24, 2017

(87) PCT Pub. No.: WO2016/015061
PCT Pub. Date: Jan. 28, 2016

(65) Prior Publication Data
US 2017/0212251 A1    Jul. 27, 2017

Related U.S. Application Data

(60) Provisional application No. 62/140,092, filed on Mar. 30, 2015, provisional application No. 62/028,803, filed on Jul. 25, 2014.

(51) Int. Cl.
*G01T 1/164* (2006.01)
*G01T 1/20* (2006.01)
*G01T 1/29* (2006.01)

(52) U.S. Cl.
CPC .............. *G01T 1/2008* (2013.01); *G01T 1/20* (2013.01); *G01T 1/2985* (2013.01); *G01T 1/2018* (2013.01)

(58) Field of Classification Search
CPC ....... G01T 1/2985; G01T 1/20; G01T 1/2002; G01T 1/2008; G01T 1/2018; A61B 6/037
See application file for complete search history.

(56) References Cited

U.S. PATENT DOCUMENTS 6,288,399 B1 *  9/2001  Andreaco ............. G01T 1/1642
                                                            250/363.03
6,362,479 B1 *  3/2002  Andreaco ............. G01T 1/1644
                                                            250/363.01

(Continued)

FOREIGN PATENT DOCUMENTS

KR    20090057831    6/2009
KR    20120077836    7/2012

*Primary Examiner* — Kiho Kim
(74) *Attorney, Agent, or Firm* — Norton Rose Fulbright US LLP

(57) ABSTRACT

High sensitivity and high spatial resolution detection modules are provided that that can be built into an array or incorporated into PET or other types of gamma ray detectors and imagers. Each detection module has a scintillation detector block, light detector and optional light guide. The detector block may be formed of a first scintillation layer material that has a fast decay constant and high light output (e.g. LYSO) and a second scintillation layer material with a slow decay constant and a lower light output (e.g. BGO) with a first layer to second layer array pitch ratio of approximately 2:3. Due to the large difference of light output and decay time of LYSO and BGO signals, three different types of events (LYSO, BGO and CLCS) can be identified with high accuracy.

11 Claims, 4 Drawing Sheets

(56) References Cited

U.S. PATENT DOCUMENTS

| | | | | |
|---|---|---|---|---|
| 6,448,559 B1* | 9/2002 | Saoudi | G01T 1/1603 | 250/367 |
| 6,552,348 B2* | 4/2003 | Cherry | G01T 1/202 | 250/363.02 |
| 6,710,349 B2* | 3/2004 | Shao | G01T 1/1644 | 250/363.02 |
| 6,749,761 B1* | 6/2004 | Andreaco | G01T 1/2002 | 216/24 |
| 7,087,905 B2* | 8/2006 | Murayama | G01T 1/1644 | 250/363.03 |
| 7,126,126 B2* | 10/2006 | Schyler | A61B 6/037 | 250/363.03 |
| 7,157,014 B1* | 1/2007 | Andreaco | B29D 11/0074 | 216/24 |
| 7,601,963 B2* | 10/2009 | Aykac | G01T 1/2018 | 250/367 |
| 7,718,972 B2* | 5/2010 | Tsuda | G01T 1/202 | 250/367 |
| 7,723,691 B2* | 5/2010 | Tonami | G01T 1/1644 | 250/361 R |
| 7,755,054 B1* | 7/2010 | Shah | C09K 11/7772 | 250/361 R |
| 8,089,047 B2* | 1/2012 | Boatner | G01T 1/2023 | 250/362 |
| 8,148,697 B2* | 4/2012 | Bauer | G01T 1/2008 | 250/370.08 |
| 8,436,312 B2* | 5/2013 | Inadama | G01T 1/2008 | 250/332 |
| 8,912,717 B2* | 12/2014 | Hartwig | H01L 33/505 | 313/46 |
| 9,012,854 B2* | 4/2015 | Wieczorek | G01T 1/2002 | 250/362 |
| 9,029,789 B2* | 5/2015 | Shibuya | G01T 1/2985 | 250/367 |
| 9,053,832 B2* | 6/2015 | Bizarri | C09K 11/7733 | |
| 9,097,808 B2* | 8/2015 | Hedler | G01T 1/20 | |
| 9,121,950 B2* | 9/2015 | Luhta | G01N 23/04 | |
| 9,304,211 B2* | 4/2016 | Goertzen | G01T 1/2018 | |
| 9,335,425 B2* | 5/2016 | Dueppenbecker | G01T 1/2985 | |
| 9,395,452 B2* | 7/2016 | Xie | A61B 6/4258 | |
| 2004/0129886 A1 | 7/2004 | Lecoq | | 250/363.03 |
| 2005/0016950 A1 | 1/2005 | Andreaco et al. | | 216/24 |
| 2009/0032717 A1 | 2/2009 | Aykac et al. | | 250/367 |

* cited by examiner

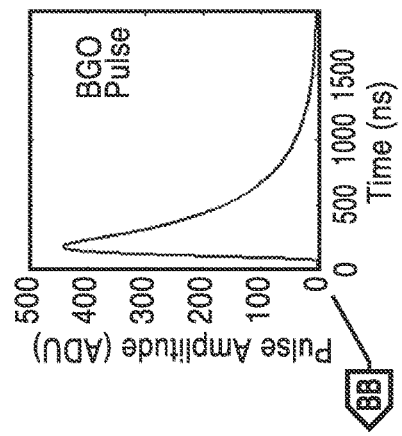
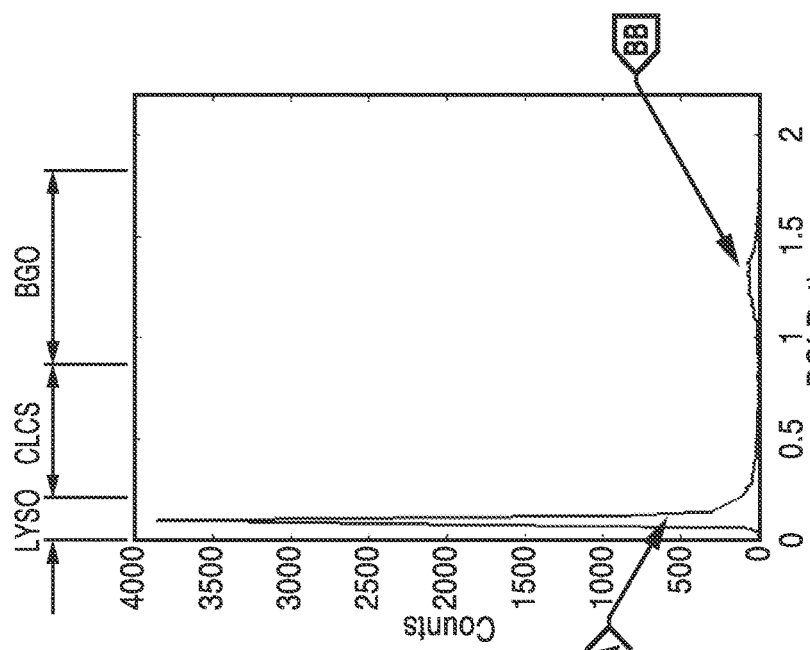
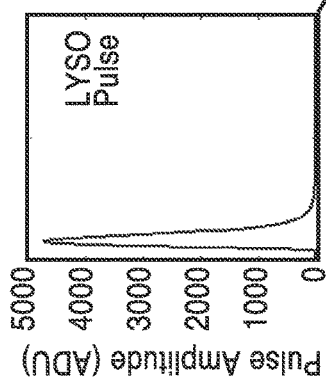
FIG. 3A
FIG. 3B
FIG. 3C

US 10,234,572 B2

MULTIPLE SPATIAL RESOLUTION SCINTILLATION DETECTORS

CROSS-REFERENCE TO RELATED APPLICATIONS

This application is a national phase application under 35 U.S.C. § 371 of International Application No. PCT/US2015/042321 filed Jul. 27, 2015, which claims priority to, and the benefit of, U.S. provisional patent application Ser. No. 62/028,803 filed on Jul. 25, 2014, and U.S. provisional patent application Ser. No. 62/140,092 filed on Mar. 30, 2015. The entire contents of each of the above-referenced disclosures are specifically incorporated herein by reference without disclaimer.

STATEMENT REGARDING FEDERALLY SPONSORED RESEARCH OR DEVELOPMENT

Not Applicable.

INCORPORATION-BY-REFERENCE OF COMPUTER PROGRAM APPENDIX

Not Applicable

BACKGROUND

1. Technical Field

The present technology pertains generally to systems and methods for the detection and imaging of ionizing radiation, and more particularly to a multiple spatial resolution modular detector block with scintillator compositions and related structures for measuring depth of interaction activity, crystal scatter identification, and improved detection of scintillation events from both high energy and low energy radioisotope distribution fields. The detector blocks can be adapted for use with a variety of detectors and are particularly suited for high performance positron emission tomography.

2. Background

Single crystal scintillation is a very simple and sensitive method for detecting high energy radiation such as x-rays, gamma-rays and high energy particles with energies that exceed a few kilo-electron volts (KeV). Crystals with high light yield, narrow energy resolution and fast decay times are required for medical imaging systems such as positron emission tomographs (PET).

Radiation interacts with a scintillation crystal transforming the energy of the absorbed quanta into multiple photons of scintillation light. The amount of light that is emitted is proportional to the energy of the charged particle and the quantity of ionizing radiation that impinges on the scintillating material.

In the case of gamma radiation, the amount and spatial distribution of light that is produced from the scintillator is dependent on whether the energy is dissipated through single or multiple Compton scattering or by the photoelectric absorption effect. The photoelectric absorption effect will produce on average, a distinguishable photo peak based on the energy of the gamma radiation that is absorbed. On the other hand, Compton scattering events will produce a broad distribution of number of scintillation light photons with no distinguishable photo peaks.

Within the context of positron emission tomography (PET), a radio labeled tracer is injected into a patient and preferentially retained by the cells of interest in order to emit positrons. Positrons emitted from the tracer normally travel over a distance of a few hundred microns in the tissues while losing kinetic energy. Each positron finally interacts with an electron of the medium resulting in an annihilation reaction where the masses of the two particles are transformed into two gamma photons or annihilation photons that have the exact same energy and travel in geometrically opposite directions.

Small animal PET scanners that are designed to image animals the size of rats and mice have been a driving force behind many of the advances of molecular imaging and have allowed characterization and understanding of some biological processes at the molecular level. The use of mice as animal models for applications in pharmacology, genetics, pathology and oncology, demand preclinical PET scanners that feature high spatial resolution and high sensitivity in order to visualize subtle distributions and to quantify low concentrations of PET tracers.

Advances in spatial resolution and sensitivity performance of imaging systems can open up applications currently out of the range of conventional PET scanners because of resolution limitations, such as mouse brain imaging and early lesion and metastasis detection in mouse models of cancer. Therefore, some of the most important research goals for preclinical PET imaging technology have been producing scanners with high sensitivity and high resolution.

Although PET can be a powerful imaging technique that has many applications in medicine, such as clinical oncology and pre-clinical pharmacology, the limited spatial resolution and sensitivity of PET scanners has suppressed its potential in small animal studies. Unfortunately, efforts to increase sensitivity and spatial resolution by using longer and narrower crystals for gamma radiation detection also eventually lead to degradation of the spatial resolution. Inter-crystal scatter (ICS) events are also a major source of error that leads to noise and degrades spatial resolution. A few methods have been developed to reduce the error associated with ICS events, but they typically require costly and demanding hardware and computational efforts that are not available for conventional Anger logic detectors.

The spatial resolution of conventional pixelated scintillation detectors is determined by the cross section of the scintillator crystal elements. The sensitivity can be increased by employing a compact system geometry to maximize the solid angle coverage, and by using long crystals for higher 511 keV gamma photon detection efficiency.

Unfortunately, long and narrow crystals in a small diameter gantry lead to increased penetration of oblique incident gamma rays before interaction. This causes event misposition, also called parallax error, degrading the spatial resolution uniformity and distorting the appearance of the reconstructed image of the source. Therefore, detectors with the capability of encoding the depth of annihilation photon interaction (DOI) are necessary. Much effort has been devoted to developing DOI PET detectors over the past several years. Among those designs, phoswich detector approaches obtain DOI information by measuring differences in light decay time between multiple layers of different scintillators. The phoswich detector design has attracted considerable interest and has been employed in several prototype scanners and commercial systems. Improved spatial resolution uniformity has been achieved in these phoswich DOI scanners compared to scanners of single layer design with equivalent scintillator volume and no DOI capability.

Inter-crystal scatter (ICS) events, where the incoming annihilation photons interact with more than one detection element within the same block detector, is another cause of event mispositioning in addition to parallax error. As the detection elements become narrower and longer, the fraction of these ICS events increases. With conventional PET detector designs that employ Anger logic positioning schemes, such ICS events appear as inaccurate detections. The spatial coordinates corresponding to the energy weighted mean of the multiple interaction sites are different from the location of first interaction. This error in determining the initial interaction location reduces image contrast and degrades spatial resolution. This leads to degradation of the lesion detectability and quantitative characteristics of an imaging system. Therefore, appropriate ICS event identification and correction methods are needed. Studies have shown that the capability of rejecting ICS events, or estimating the first interaction site of an ICS event using selection criteria, or maximum likelihood based on Compton kinematics, yields improved image quality and quantification. However, those approaches require complicated and costly data acquisition systems for measuring individual interactions of the ICS events and significant computational efforts for determining the location of first interaction, neither of which are available for conventional Anger logic detectors.

Accordingly, there is a need for improved scintillator detectors and imaging devices that have high spatial resolution and high sensitivity and are capable of high-resolution, high performance imaging.

BRIEF SUMMARY

The technology described herein generally comprises a modular scintillation detector block apparatus that can be formed into arrays and methods of radiation detection and imaging.

A multi-resolution approach to gamma radiation detection with two pixelated scintillator arrays of different materials and pitch can be utilized. This approach provides a modular detector block with two crystal arrays. Each block has one array with high and one array with very high spatial resolution. Furthermore, with appropriate signal processing, this detector can properly detect and identify intercrystal scatter between the arrays within each detector block. Coincidence detection between each of the different arrays of opposing detector blocks provides a very high resolution and very high sensitivity coincidence PET scanner, which has the capability to reject intercrystal scatter. PET imaging systems designed and constructed with such detectors can reach unprecedented performance in spatial resolution and sensitivity, without significantly increasing the system cost.

In a preferred embodiment, the detector configuration comprises two layers of pixelated scintillator crystal arrays, a glass lightguide and a light detector. The annihilation photon entrance (top) layer is a 48×48 array of 1.01×1.01×7 mm$^3$ LYSO crystals. The bottom layer is a 32×32 array of 1.55×1.55×9 mm$^3$ BGO crystals. A tapered, multiple-element glass lightguide is optionally used to couple the exit end of the BGO crystal array (52×52 mm$^2$) to the photosensitive area of the Position Sensitive Photomultiplier Tube (46×46 mm$^2$), allowing the creation of flat panel detectors without gaps between the detector modules.

In one embodiment, a phoswich depth of interaction (DOI) detector design comprises two layers of pixelated scintillator crystal arrays made from cerium doped lutetium-yttrium oxyorthosilicate (LYSO) and bismuth germanate (BGO), a multi-element glass lightguide, and a Position Sensitive Photo-Multiplier Tube (PSPMT). The aim of the detector design is to achieve high sensitivity and high spatial resolution PET imaging. The two layer detector configuration is designed to retrieve DOI information that will improve spatial resolution uniformity across the field of view. Furthermore, this detector allows identification of the majority of the cross layer crystal scatter (CLCS) events (the ICS events that deposit their energy in both layers), allowing a great reduction of this source of error.

BGO and LYSO, common scintillator materials for PET detectors, are preferred materials for use in the phoswich detector configuration. Both BGO and LYSO have high stopping power, resulting from their high effective atomic Z (75 and 62) and high density (7.13 g/cm$^3$ and 7.3 g/cm$^3$). Compared to detectors made from lower stopping power scintillators such as GSO, the detector made from BGO or LYSO yields higher sensitivity, reduced DOI effect resulting from the reduced crystal penetration, and reduced ICS events. The reduction of ICS events leads to improvements in local image contrast. Although BGO and LYSO are preferred, other materials with similar characteristics can also be used.

The LYSO/BGO phoswich embodiment also has several advantages. Due to the large difference on light output and decay time of LYSO and BGO signals, three different types of events (LYSO, BGO and CLCS) can be identified with high accuracy. As a result, the DOI information can be retrieved accurately for parallax error correction, leading to improved spatial resolution uniformity. In addition, the capability of identifying the majority of the CLCS events should lead to improved event positioning accuracy and local contrast resolution. It has been shown that the capability of rejecting ICS events, or estimating the first interaction site of an ICS event, yields improved image quality and quantification. Furthermore, this design is cost effective, as it only requires traditional Anger logic and single end readout of the scintillation light. The delayed charge integration method for event type discrimination is simple and robust, and can be easily implemented in most digital or analog electronic systems.

Additionally, estimating the first interaction site for ICS events has been proved to yield improved image quality and quantification. Simulation and measurement results indicate that the detector enables the identification of the first interaction sites of the CLCS events, due to the large difference of light output and decay time between BGO and LYSO. The first interaction sites for most CLCS events can be obtained if the LYSO signal component from a CLCS event can be extracted separately for event position calculation. It has been shown in the preferred embodiment that the $C_1$ and $C_2$ types of events illustrated in FIG. 1B, corresponding to 89% of the total CLCS (11.7% in 13.2%), encounter their first interactions in the LYSO layer.

According to one aspect of the technology, a modular scintillation detector block is provided that has a LYSO top layer and a BGO bottom layer with a LYSO:BGO array crystal pitch ratio of 2:3.

Another aspect of the technology is to provide a multiple spatial resolution detector device with a detector with a fine resolution layer and gross resolution layer in a single detector block.

According to another aspect of the technology, a device is provided with a multiple spatial resolution modular scintillation detector block that is capable of measuring depth of interaction, crystal scatter identification, and improved detection of scintillation events.

A further aspect of the technology is to provide a device with arrays of detecting modules with two layers of pixelated scintillation crystals and a light detector.

Further objects and aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only:

FIG. 3A through FIG. 3C is a DCI ratio histogram for events acquired from the "X1" channel shown in FIG. 2.

DETAILED DESCRIPTION

Referring more specifically to the drawings, for illustrative purposes, embodiments of the apparatus and methods for multiple spatial resolution radiation detection are generally shown. Several embodiments of the technology are described generally in FIG. 1 through FIG. 3C to illustrate the apparatus and methods. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Figure 1A:
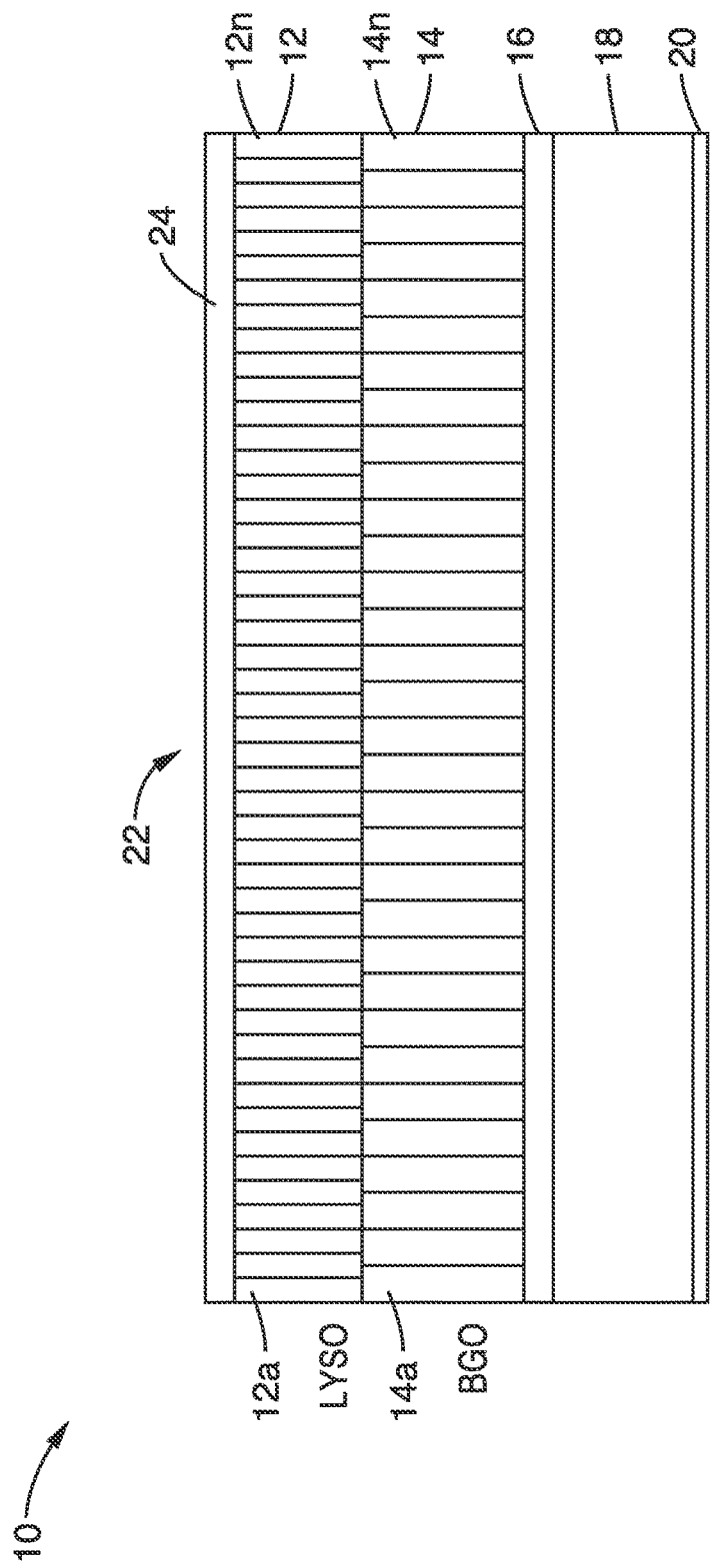
FIG. 1A is a schematic depiction of a detector module structure (not to scale) with two layers of pixelated scintillator crystal arrays of different pitch, a glass lightguide and a light detector according to one embodiment of the technology.

Turning now to FIG. 1A, one embodiment of a modular apparatus 10 for detecting gamma radiation is depicted schematically and not to scale. A simple detector module 10 is described to illustrate the structure and geometry of the sensing block that has fine and gross resolution layers in a single block. The illustrated modules can be adapted to detector applications ranging from medical diagnostic imaging and analytical devices to industrial applications such as non-destructive inspection devices. The modules are particularly suited for arrays used in PET (Position Emission Tomography), TOF PET (Time of Flight Positron Emission Tomography) and DOI PET (Depth of Interaction Positron Emission Tomography) imaging.

The detector module configuration shown in FIG. 1A has two layers of pixelated scintillator crystal arrays of a particular geometry, a glass lightguide and a light detector. The modules are preferably arranged to maximize the precision in locating the scintillation events shown in FIG. 1B.

The illustrated module 10 has a sensing element with a top layer 12 of pixelated scintillator crystal array elements 12a through 12n that is configured as annihilation photon entrance layer with an entrance surface 22 that is generally directed towards the subject or radiation source. In the embodiment shown in FIG. 1A, an optional internally reflective layer 24 can be placed on the outer entrance surface 22 of the top scintillation layer 12. The purpose of the reflective layer 24 is to enhance reflection of scintillation light onto the light detector.

The top scintillator layer 12 is made from a material with the highest light output and fast decay kinetics. A top layer 12 formed from cerium doped lutetium-yttrium oxyorthosilicate (LYSO) crystals is particularly preferred. However, scintillator variants including Lutetium oxyorthosilicate (LSO) and Yttrium Orthosilicate (YSO) crystals are also preferred top layer materials.

In one embodiment, the LYSO and BGO crystal elements of layer 12 and layer 14 respectively are mechanically polished on all sides except for exit ends and where the exit ends are diffusely ground. In another embodiment, the long sides of each individual crystal are bonded with a specular optical reflector.

The top layer 12 of LYSO crystals is joined to a second or bottom layer 14 of pixelated scintillator crystal array elements 14a through 14n preferably formed from a scintillator with lower light output and comparatively slower kinetics. A second crystal layer 14 is preferably made from bismuth germanate (BGO) crystals. This is a combination of both fast and slow materials and provides a fine resolution layer and gross resolution layer in a single detector block. In this embodiment, LYSO has very high light yield of up to 35,000 photons per MeV and a fast decay time of 42 ns. By comparison, BGO has a comparatively low light yield of 8,000 photons per MeV and a long decay time of approximately 300 nanoseconds (ns).

The thickness of the (LYSO) top layer 12 and the thickness of the (BGO) bottom layer 14 are not identical and each layer can have a uniform or non-uniform thickness. The LYSO top layer and a BGO bottom layer preferably have a LYSO:BGO pixel pitch ratio of approximately 2:3. The selected crystal pitch of the top and bottom layers allows for multiple spatial resolutions. For example, in FIG. 1A and FIG. 1B, forty-eight array elements are shown in top layer 12 and 32 array elements are shown in bottom layer 14 for a pixel pitch ratio of 32/48=2:3.

The bottom layer 14 is configured as an exit layer and has a bottom surface that is optionally coupled to a lightguide 16. The preferred lightguide is a tapered, multiple-element glass lightguide 16. Light is directed from the lightguide 16 to one or more light detectors 18 such as a Photo Multiplier Tube ("PMT") for detection. The light detector 18 is typically capable of converting incoming photons to a signal of electric current pulses. The tapered, multiple-element glass lightguide 16 that is used to couple the exit end of the BGO crystal array 14 to the photosensitive area of the Position Sensitive Photomultiplier Tube 18, for example, allows the creation of flat panel detectors without the presence of gaps between the detector modules. A Position Sensitive Photomultiplier Tube (PSPMT), silicon photomultiplier (SiPM) an avalanche photodiode (APD) or any other position sensitive photon counting photodetector are particularly preferred as a readout system. In one embodiment, the geometry of the photodetector 18 that is selected allows the elimination of the lightguide 16 as an element. Such a configuration is possible with SiPM arrays that have very small dead area around the active pixels.

The signals produced by the PSMPT light detector 18 can be processed and amplified with electronic circuitry 20. In one embodiment, the signals are sent to a processor for receiving the data from all of the detector modules that has software executed on the processor for analyzing the data from the detector modules and for reconstructing a tomographic image based on the data, for example. Two dimensional images of the object can be displayed on a device display, stored or printed in some adaptations of the modules.

In one embodiment of the detector, two layers of the scintillator arrays with different crystal pitch are used, with the LYSO crystal (1.08 mm pitch) smaller than the BGO crystal (1.63 mm pitch). This approach takes full advantage of the higher light output of the LYSO scintillator. Utilizing finer pixelated detector as an accessory for a coarse pixelated scintillator scanner has been proven to significantly improve the spatial resolution of the overall images. Therefore, the detector benefits from the finer pitch of the LYSO layer and achieve sub-millimeter spatial resolution, if the detector and system response are appropriately modeled for image reconstruction.

Figure 1B:
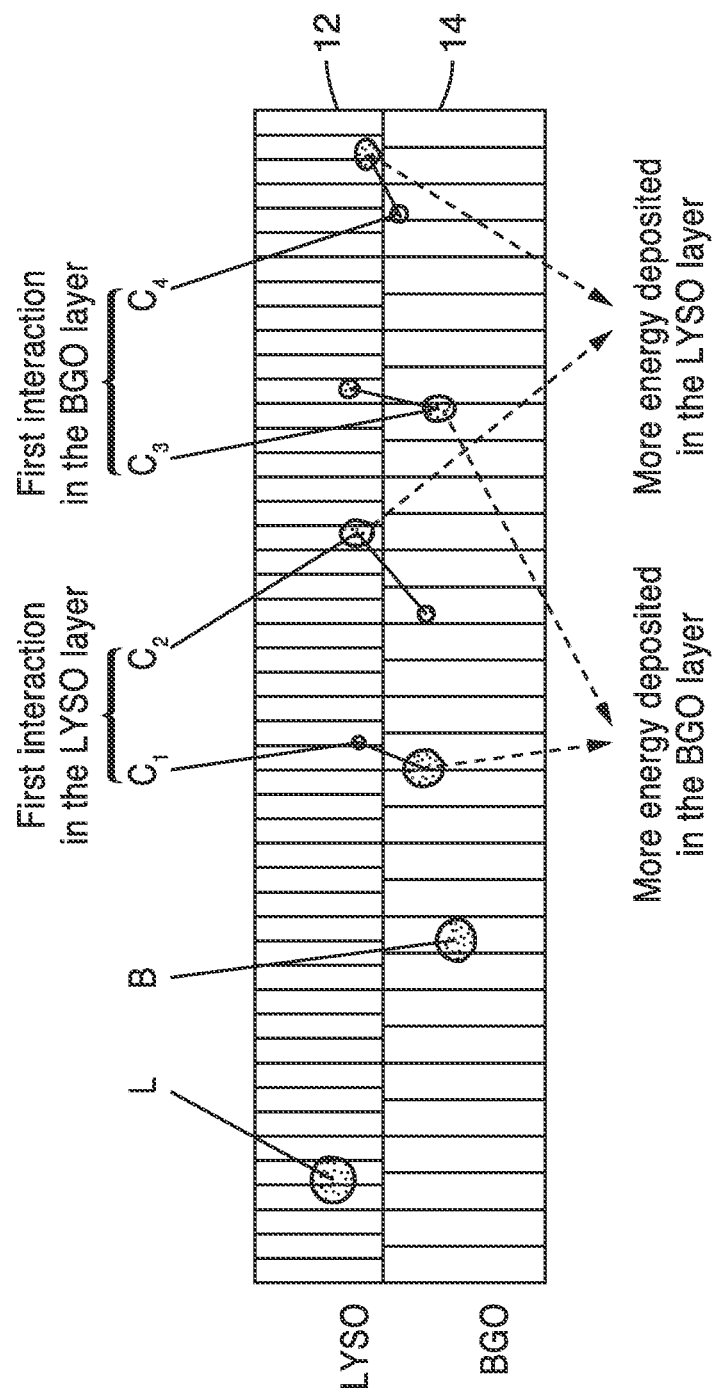
FIG. 1B is a schematic depiction of a sensor layer structure illustrating different types of detectable events where L=LYSO events, B=BGO events and $C_1$-$C_4$ represent four types of cross layer crystal scatter (CLCS) events.

The potential events resulting from radiation impinging on the LYSO layer 12 and BGO layer 14 materials are illustrated in FIG. 1B. The detected singles events of the device can be classified into six primary categories, as follows:

(1) L: The energy deposited in the detector panel is contributed only from the interaction with the LYSO layer.

(2) B: The energy deposited in the detector panel is contributed only from the interaction with the BGO layer.

(3) C1: The gamma photon deposits its energy in both layers, with its first interaction at the LYSO layer. The energy deposited in the LYSO layer is smaller than that deposited in the BGO layer.

(4) C2: The gamma photon deposits its energy in both layers, with its first interaction at the LYSO layer. The energy deposited in the LYSO layer is larger than that deposited in the BGO layer.

(5) C3: The gamma photon deposits its energy in both layers, with its first interaction at the BGO layer. The energy deposited in the LYSO layer is smaller than that deposited in the BGO layer.

(6) C4: The gamma photon deposits its energy in both layers, with its first interaction at the BGO layer. The energy deposited in the LYSO layer is larger than that deposited in the BGO layer.

The interaction history of each detected event can be investigated and the fraction representing each event type from the total number of interacting gammas can be calculated. Consequently, the potential for recovering these events will further enhance the system sensitivity and detector contrast because the system can properly detect and identify intercrystal scatter. The rejection of intercrystal scatter is one key for the realization of higher image contrast. The multiresolution approach, of a high spatial resolution detector block with two scintillators of different pitch and scintillation time constants can also provide depth-of-interaction (DOI) resolution and time-of-flight (TOF) and other pertinent information for detection display or imaging.

The technology described herein may be better understood with reference to the accompanying examples, which are intended for purposes of illustration only and should not be construed as in any sense limiting the scope of the technology described herein as defined in the claims appended hereto.

Example 1

To evaluate the characteristics and benefits of the LYSO/BGO phoswich configuration, the data acquired with a prototype two layer detector panel of FIG. 1B was simulated with the Geant4 application for tomographic emission (GATE) Monte Carlo simulation software.

The detector panel was comprised of a 48×96 array of LYSO crystals coupled to a 32×64 array of BGO crystals. A 10 µCi point source with isotropic emission of single 511 keV gamma photons was positioned 2.5 cm from the LYSO front layer surface. The simulation was acquired with an energy resolution of 18%. An energy window of 50-650 keV was applied to the singles processing chain at the stage of initial simulation. To confine the investigation to the detector characteristics of crystal scatter on positioning accuracy, no attenuation material was included between the source and the detector, and the phantom scatter was not considered. The lightguide and the scintillation light collection processes were not simulated. The Root format output from GATE was used, which stores information of particle transportation and interactions on an event-by-event basis, allowing event history to be retrieved. The detected singles events were classified into the six primary categories (L, B, and C1-C4) as shown in FIG. 1B.

To retrieve the characteristics of the detected single events for appropriate event classification, customized software was developed in C++ to analyze the Root output file from GATE. The interaction history of each detected event was investigated and the fraction representing each event type from the total number of interacting gammas was calculated.

The fractions of different types of events illustrated in FIG. 1B are summarized in Table 1. In singles detection mode, the fractions of L (LYSO) and B (BGO) events were 54.2% and 32.6% respectively. The total fraction of singles CLCS events including $C_1$, $C_2$, $C_3$ and $C_4$ is 13.2%. Considering the coincidence events, the fraction of CLCS events will increase to around 25%, because a line of response (LOR) will be considered as a CLCS event as long as any one of the two single detections is a CLCS event.

Among the four types of the CLCS events, $C_1$ was the dominant component. This is consistent with the Compton kinetics that gamma rays preferentially scatter in the direction of the incident gamma ray, depositing a relatively smaller amount of energy in the crystal of first interaction. The $C_1$ and $C_4$ types of events, corresponding to 77% of the total CLCS (10.1% out of 13.2%), deposit most of their energy in a scintillator layer different from the layer of first interaction. If a traditional Anger logic positioning scheme is applied, those events will yield inaccurate position and DOI information. If these mispositioned events are included, they will degrade image contrast and spatial resolution. Identification of those events for rejection or correction may lead to significant improvements in imaging performance.

Example 2

In order to demonstrate the technology, a phoswich depth of interaction (DOI) detector sensing element composed of two layers of scintillator array made from cerium doped lutetium-yttrium oxyorthosilicate (LYSO) and bismuth germanate (BGO) was prepared.

The top (gamma ray entrance) layer was a 48×48 array of 1.01×1.01×7 mm³ LYSO crystals (1.09 mm pitch). The bottom (facing the PMT) layer was a 32×32 array of 1.55×1.55×9 mm³ BGO crystals (1.63 mm pitch). LYSO and BGO scintillator elements were multiplexed in a ratio of 9:4, with each 3×3 LYSO array segment being coupled to a 2×2 BGO array segment. The LYSO and BGO crystal elements were mechanically polished on all sides with the exception of the exit ends which were diffusely ground. The four long sides of each individual crystal were bonded with a specular optical reflector (3M, St Paul, Minn.). The entrance surface of the LYSO array was covered with four layers of Teflon tape to enhance reflection of the scintillation light onto the PSPMT.

Example 3

To further demonstrate the technology, an array of multiple spatial resolution modules of two layer pixelated scintillators, a glass lightguide and a light detector was produced. A tapered, multiple-element glass lightguide was used to couple the exit end of the BGO crystal array (52×52 mm$^2$) to the photosensitive area of the PSPMT (46×46 mm$^2$). The lightguide and BGO scintillator elements were 1:1 coupled (non-multiplexed). The complete individual detector module offers an overall dimension of 52×52 mm$^2$ *that* matched the external dimensions of the PSPMT package, which allowed continuous positioning of the scintillator arrays for creating flat panel detectors without introducing gaps between detector modules.

The Hamamatsu H12700 PSPMT was used for detection. The H12700 PSPMT offered a high photoelectron collection efficiency. Optical grease (BC-630, Saint-Gobain Crystals, Hiram, Ohio) was used for coupling between the two layers of scintillator arrays, the exit face of the BGO scintillator array to the entrance face of the lightguide, and the exit face of the lightguide to the PSPMT.

Example 4

Figure 2:
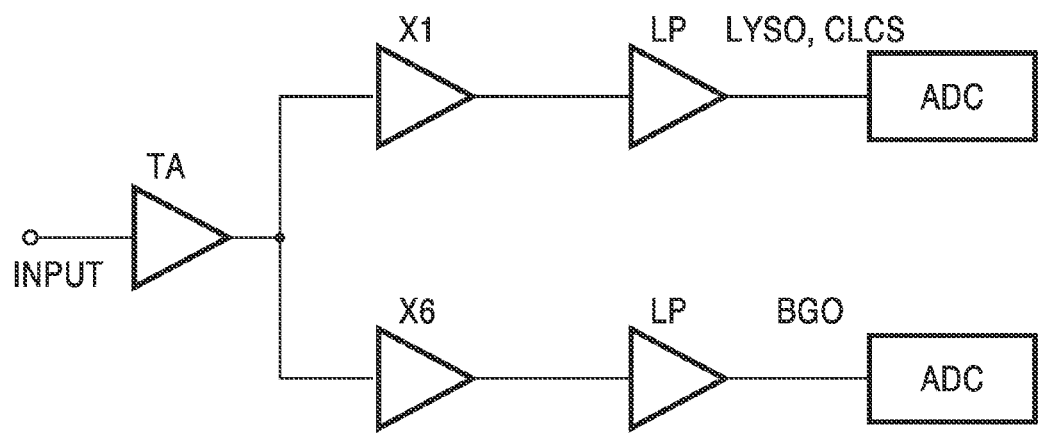
FIG. 2 is a schematic diagram of one of four identical signal processing circuits used for simultaneously acquiring LYSO, CLCS and BGO scintillation events. The input is from one of the four corners of the charge division resistor network. TA is a transimpedance amplifier with a conversion gain of 750 mV/mA. LP is a low pass filter with a cut-off of −3 dB at 6 MHz.

The modules built for Example 3 were tested and evaluated. One of four identical signal processing circuits used for simultaneously acquiring LYSO, CLCS and BGO scintillation events is shown in FIG. 2. The input is from one corner of the charge division resistor network. The element identified as TA was a transimpedance amplifier with a conversion gain of 750 mV/mA. The LP element is a low pass filter with a cut-off of −3 dB at 6 MHz.

A. Readout

The 64 anode outputs from the PSPMT were multiplexed using a charge division resistor network to four position encoding signals read out from four corner amplifiers. Due to the large difference in scintillation light output and decay time between LYSO and BGO (35,000 photons/MeV versus 8,000 photons/MeV; 42 ns vs. 300 ns), the amplitude of the LYSO signal is 20~30 times higher than that of the BGO signal. To fit the LYSO signal within the dynamic range of the analogue-to-digital converters (ADC) (VHS-ADC, Nutaq, Quebec City, Quebec) without saturation, overall signal amplification is reduced. As a result, the BGO signal becomes too weak to overcome electronic noise, degrading the position decoding accuracy of the BGO events. In order to simultaneously retrieve accurate information from both the LYSO and BGO signals, a readout circuit was designed and constructed to amplify the detector response by two different factors, as shown in FIG. 2: the signals from the route amplified with higher gain (×6) were used to detect BGO events, and the signals from the route with lower gain (×1) were used to detect the LYSO and CLCS events. The two amplified analog signals were filtered by a low pass circuit with a cut-off of −3 dB at 6 MHz. This was done to permit accurate subsequent digital conversion of the signals by two 104 MHz free running ADCs on a signal processing card (VHS-ADC, Nutaq, Quebec City, Quebec). Four identical sets of the signal processing circuits described in FIG. 2 were used to read four corner position encoding signals from the detector. The digital samples were processed in a Xilinx Virtex-4 field programmable gate array (FPGA) (Xilinx, San Jose, Calif.) in real time, including event triggering, pulse shape discrimination, and event energy and position calculation.

B. Pulse Shape Discrimination

The four corner position encoding signals amplified by the same factor were digitized and summed in the FPGA, producing an energy pulse for each event. The delayed charge integration (DCI) technique, an algorithm measuring the different light decay constants of two scintillators (LYSO=42 ns, BGO=300 ns) to identify event types was applied. For each triggered event, the sum pulse was partially integrated with two intervals: 0-190 ns and 190-800 ns. The ratio of the 190-800 ns integration to the 0-190 ns integration, which depends on the characteristic light decay time of the scintillators, was defined as the DCI ratio. Approximately 10,000 events were acquired from the "X1" channel shown in FIG. 2 and the DCI ratio histogram was plotted in FIG. 3A through FIG. 3C. The LYSO, BGO and CLCS events were identified based on the DCI ratio: detections with a DCI ratio less than 0.2 were identified as LYSO events; detections with a DCI ratio larger than 0.8 were assigned as BGO events; detections with a DCI ratio between 0.2 and 0.8 were classified as CLCS events. Based on the event type identified, the FPGA integrates BGO pulses for 800 ns and integrated LYSO and CLCS pulses for 190 ns that were used for subsequent event energy and position calculations that were recorded to the list-mode file.

C. Flood Image and Energy Spectrum

A 0.25 MBq (6.9 μCi)$^2$Na point source (Eckert & Ziegler Isotope Products, Valencia, Calif.) was placed approximately 3 cm from the top face of the LYSO array. The measured count rate with the source was 60.7 kcps. The intrinsic LYSO background for the same experimental setup was measured to be 4.5 kcps without the source. For each detected event, the X and Y coordinates were calculated according to Anger logic. Two-dimensional flood images for LYSO, BGO and CLCS events were acquired. The boundaries were determined for the BGO and LYSO flood images using a semi-automated program to define the crystal LUT that classifies regions in the flood image into the proper crystal of the scintillator arrays. Energy spectra for individual crystals were extracted based on the LUTs and a Gaussian function was fitted to the photopeak of each energy spectra. Energy resolution was measured for every crystal in the detector as the full width at half-maximum (FWHM) of the Gaussian function divided by the energy corresponding to the center of the photopeak, expressed as a percentage resolution. One dimensional profiles were extracted from the LYSO and BGO flood images and the average peak-to-valley ratios (PVR) for the selected profiles were reported. The average PVR of these selected profiles were 3.5 for LYSO and 2.0 for BGO.

Flood images and energy spectra of different event types were acquired with an energy window of 250-700 keV. More than 95% of the LYSO and BGO crystals, including the majority of the edge crystals, were clearly resolved.

The CLCS events were acquired from the path with lower gain (×1) (FIG. 2), which was also used to acquire the LYSO events. Therefore, the CLCS events use the same energy scale as that for the LYSO events. The CLCS flood image was acquired with an open energy window of 100-700 keV. A distinct pattern was observed in the CLCS flood images, appearing as a blurred LYSO flood image. This is because the positions of the CLCS events are primarily determined by their LYSO signal component. The CLCS pulses were integrated for 190 ns to calculate the event position. Because LYSO has much higher light output and shorter decay time than BGO, most of the CLCS event signal within the first 190 ns is contributed from the LYSO signal. In the CLCS energy spectra, the energies of most CLCS events fell below 250 keV, which agreed with the simulation result that most CLCS events deposit less energy in the LYSO layer ($C_1$ and $C_3$ in Table 1, corresponding to 83% of the total CLCS events).

The energy resolutions calculated from individual crystals are shown in Table 2. The average detector energy resolution derived by averaging those of the individual crystal spectra was 13.4±4.8% for LYSO and 18.6±3.2% for BGO (FWHM±1 SD).

Both simulations and physical measurements demonstrate that the detector can provide high spatial and contrast resolution, high sensitivity, and a DOI PET system. The individual modular detector design also provides flexibility in the configuration of large area detector plates and multiple-detector systems. Besides preclinical PET imaging, the proposed detector may also be used in neuro-imaging and other specialized imaging system like PEM where high spatial resolution and high sensitivity are also desired.

From the discussion above it will be appreciated that the technology described herein can be embodied in various ways, including the following:

1. A high resolution depth of interaction gamma radiation detector device, comprising: (a) a first layer of pixelated scintillator crystal array elements selected from the group consisting of cerium doped lutetium-yttrium oxyorthosilicate (LYSO), Lutetium oxyorthosilicate (LSO), and Yttrium Orthosilicate (YSO) crystals, wherein the first layer has a first layer pitch and an entrance surface; (b) a second layer of pixelated scintillator crystal array elements comprising bismuth germanate (BGO) crystals optically coupled to the first layer, wherein the second layer has a second layer pitch and an exit surface; and (c) a light detector operably coupled to the exit surface of the second layer; (d) wherein the first layer pitch and the second layer pitch have a ratio of 2:3.

2. The device of any preceding embodiment, further comprising a light guide coupled to the exit surface of the second layer and to a photosensitive area of the light detector.

3. The device of any preceding embodiment, wherein the light guide comprises a tapered, multiple-element glass lightguide.

4. The device of any preceding embodiment, wherein the light detector comprises at least one detector selected from the group consisting of a Position Sensitive Photomultiplier Tube (PSPMT), a silicon photo multiplier array (SiPM), and an avalanche photodiode array (APD).

5. The device of any preceding embodiment, further comprising: signal processing circuits operably coupled to the light detector the signal processing circuits configured to acquire first layer scintillation events, cross layer crystal scatter (CLCS) events and second layer scintillation events.

6. The device of any preceding embodiment, further comprising an internally optically reflective layer disposed on the entrance surface of the first layer to enhance reflection of scintillation light onto the light detector.

7. The device of any preceding embodiment, wherein the LYSO and BGO crystal elements are mechanically polished on all sides except for exit ends and wherein the exit ends are diffusely ground.

8. The device of any preceding embodiment, wherein four long sides of each individual crystal of the first layer and the second layer are bonded with a specular optical reflector.

9. The device of any preceding embodiment: wherein the first layer comprises a 48×48 array of 1.01×1.01×7 mm³ LYSO crystals (1.09 mm pitch); wherein the second layer comprises a 32×32 array of 1.55×1.55×9 mm³ BGO crystals (1.63 mm pitch); and wherein the first layer LYSO scintillator array elements are 9:4 (3×3:2×2) multiplexed coupled onto corresponding second layer BGO scintillator array elements.

10. A positron emission tomography (PET) scanner comprising: (a) a plurality of scintillation detector modules, each module comprising: (i) a first layer of pixelated scintillator crystal array elements comprising cerium doped lutetium-yttrium oxyorthosilicate (LYSO) crystals, the first layer configured as annihilation photon entrance layer having an entrance surface and a first layer pitch; (ii) a second layer of pixelated scintillator crystal array elements comprising bismuth germanate (BGO) crystals optically coupled to the first layer, the second layer configured as an exit layer having an exit surface and a second layer pitch, the first layer pitch and the second layer pitch in a ratio of 2:3; (iii) a light detector coupled to the exit surface of the second layer, the light detector producing a signal; and (b) a computer processor configured to receive signal data from the light detector of each module; (c) a non-transitory computer-readable memory storing instructions executable by the computer processor; (d) wherein the instructions, when executed by the computer processor, perform steps comprising: (i) processing the light detector signal data; (ii) identifying LYSO and BGO scintillation events from the signal data; (iii) identifying cross layer crystal scatter (CLCS) events from the signal data; (iv) eliminating CLCS events from the signal data; and (v) reconstructing a tomographic image based on the signal data.

11. The device of any preceding embodiment, further comprising an internally optically reflective layer disposed on the entrance surface of the first layer to enhance reflection of scintillation light onto the light detector 12. The device of any preceding embodiment, further comprising a light guide coupled to the exit surface of the second layer and to a photosensitive area of the light detector.

13. The device of any preceding embodiment, wherein the light guide comprises a tapered, multiple-element glass lightguide.

14. The device of any preceding embodiment, wherein the light detector is a detector selected from the group of detectors consisting of a Position Sensitive Photomultiplier Tube (PSPMT) light detector, a silicon photo multiplier array (SiPM), and an avalanche photodiode array (APD).

15. A high resolution depth of interaction gamma radiation detector, comprising: (a) a first layer of pixelated scintillator crystal array elements, the first layer configured as annihilation photon entrance layer and having an entrance surface, the first layer comprising cerium doped lutetium-yttrium oxyorthosilicate (LYSO) crystals; (b) a second layer of pixelated scintillator crystal array elements, the second layer configured as an exit layer and having an exit end, the second layer comprising bismuth germanate (BGO) crystals; (c) a Position Sensitive Photomultiplier Tube (PSPMT) light detector; and (d) a tapered, multiple-element glass lightguide positioned to couple the exit end of the second layer to a photosensitive area of the PSPMT.

16. The detector of any preceding embodiment claim 15, wherein the detector is a flat panel detector without gaps between layers.

17. The detector of any preceding embodiment: wherein the first layer comprises a 48×48 array of 1.01×1.01×7 mm³ LYSO crystals (1.09 mm pitch); and wherein the second layer comprises a 32×32 array of 1.55×1.55×9 mm³ BGO crystals (1.63 mm pitch).

18. The detector of any preceding embodiment, wherein the detector is a component of a PET imaging apparatus.

19. The detector of any preceding embodiment, wherein the detector is a phoswich depth of interaction (DOI) detector.

20. The detector of any preceding embodiment, wherein the detector has provides high sensitivity and high spatial resolution for PET imaging.

21. The detector of any preceding embodiment, wherein LYSO scintillator array elements are 9:4 (3×3:2×2) multiplexed coupled onto corresponding BGO scintillator array elements.

22. The detector of any preceding embodiment, wherein the LYSO and BGO crystal elements are mechanically polished on all sides except for exit ends and wherein the exit ends are diffusely ground.

23. The detector of any preceding embodiment, wherein four long sides of each individual crystal are bonded with a specular optical reflector.

24. The detector of any preceding embodiment, wherein the entrance surface of the first layer is covered with four layers of Teflon tape to enhance reflection of scintillation light onto the PSPMT.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Fraction Of Different Types Of Events Illustrated In FIG. 1

| | Type | | | | |
|---|---|---|---|---|---|
| L | B | $C_1$ | $C_2$ | $C_3$ | $C_4$ |
| fraction 54.2% | 32.6% | 9.8% | 1.9% | 1.2% | 0.3% |

TABLE 2

Energy resolution of the LYSO/BGO phoswich detector

| Scintillator | Mean (%) | Best (%) | Worst (%) |
|---|---|---|---|
| LYSO | 13.4 ± 4.8 | 9.7 | 37.0 |
| BGO | 18.6 ± 3.2 | 16.0 | 33.9 |

What is claimed is:

1. A high resolution depth of interaction gamma radiation detector device, comprising:
    (a) a first layer of pixelated scintillator crystal array elements selected from the group consisting of cerium doped lutetium-yttrium oxyorthosilicate (LYSO), Lutetium oxyorthosilicate (LSO), and Yttrium Orthosilicate (YSO) crystals, wherein the first layer has a first layer pitch and an entrance surface;
    (b) a second layer of pixelated scintillator crystal array elements comprising bismuth germanate (BGO) crystals optically coupled to the first layer, wherein the second layer has a second layer pitch and an exit surface; and
    (c) a light detector operably coupled to the exit surface of the second layer;
    (d) wherein said first layer pitch and said second layer pitch have a ratio of 2:3.

2. The device as recited in claim 1, further comprising:
    a light guide coupled to the exit surface of the second layer and to a photosensitive area of the light detector.

3. The device as recited in claim 2, wherein said light guide comprises a tapered, multiple-element glass lightguide.

4. The device as recited in claim 1, further comprising:
    signal processing circuits operably coupled to said light detector, said signal processing circuits configured to acquire first layer scintillation events, cross layer crystal scatter (CLCS) events and second layer scintillation events.

5. The device as recited in claim 1, further comprising an internally optically reflective layer disposed on the entrance surface of the first layer to enhance reflection of scintillation light onto the light detector.

6. The device as recited in claim 1, wherein the LYSO and BGO crystal elements are mechanically polished on all sides except for exit ends and wherein the exit ends are diffusely ground.

7. The device as recited in claim 1, wherein four long sides of each individual crystal of said first layer and said second layer are bonded with a specular optical reflector.

8. A positron emission tomography (PET) scanner comprising:
    (a) a plurality of scintillation detector modules, each module comprising:
        (i) a first layer of pixelated scintillator crystal array elements comprising cerium doped lutetium-yttrium oxyorthosilicate (LYSO) crystals, the first layer configured as annihilation photon entrance layer having an entrance surface and a first layer pitch;
        (ii) a second layer of pixelated scintillator crystal array elements comprising bismuth germanate (BGO) crystals optically coupled to the first layer, the second layer configured as an exit layer having an exit surface and a second layer pitch, said first layer pitch and said second layer pitch in a ratio of 2:3;

(iii) a light detector coupled to the exit surface of the second layer, said light detector producing a signal; and
(b) a computer processor configured to receive signal data from the light detector of each module;
(c) a non-transitory computer-readable memory storing instructions executable by the computer processor;
(d) wherein said instructions, when executed by the computer processor, perform steps comprising:
  (i) processing said light detector signal data;
  (ii) identifying LYSO and BGO scintillation events from the signal data;
  (iii) identifying cross layer crystal scatter (CLCS) events from the signal data;
  (iv) eliminating CLCS events from the signal data; and
  (v) reconstructing a tomographic image based on said signal data.

9. The scanner as recited in claim 8, further comprising an internally optically reflective layer disposed on the entrance surface of the first layer to enhance reflection of scintillation light onto the light detector.

10. The scanner as recited in claim 8, further comprising a light guide coupled to the exit surface of the second layer and to a photosensitive area of the light detector.

11. The scanner as recited in claim 10, wherein said light guide comprises a tapered, multiple-element glass light-guide.

* * * * *